(12) United States Patent
Harmon et al.

(10) Patent No.: US 12,063,882 B2
(45) Date of Patent: Aug. 20, 2024

(54) VOLUMETRIC METERING SYSTEM WITH IMPROVED ROLLER DETECTION

(71) Applicant: Deere & Company, Moline, IL (US)

(72) Inventors: Andrew W. Harmon, Davenport, IA (US); Mandar Mhalsakant Kale, Pune (IN); Terrill W Murray, Milan, IL (US)

(73) Assignee: DEERE & COMPANY, Moline, IL (US)

( * ) Notice: Subject to any disclaimer, the term of this patent is extended or adjusted under 35 U.S.C. 154(b) by 828 days.

(21) Appl. No.: 16/930,895

(22) Filed: Jul. 16, 2020

(65) Prior Publication Data

US 2021/0127563 A1    May 6, 2021

Related U.S. Application Data

(60) Provisional application No. 62/928,667, filed on Oct. 31, 2019.

(51) Int. Cl.
*A01C 7/12*    (2006.01)

(52) U.S. Cl.
CPC .............. *A01C 7/127* (2013.01); *A01C 7/125* (2013.01)

(58) Field of Classification Search
CPC ................................ A01C 7/127; A01C 7/125
See application file for complete search history.

(56) References Cited

U.S. PATENT DOCUMENTS

| | | |
|---|---|---|
| 4,059,161 A | 11/1977 | Smith et al. |
| 4,483,401 A | 11/1984 | Robertson |
| 5,050,372 A | 9/1991 | Heiskell |
| 5,076,180 A | 12/1991 | Schneider |
| 5,507,351 A | 4/1996 | Martin |
| 7,409,916 B2 | 8/2008 | Fry et al. |

(Continued)

FOREIGN PATENT DOCUMENTS

| | | |
|---|---|---|
| CA | 2023798 C | 3/1994 |
| CA | 2695738 A1 | 6/2010 |

(Continued)

OTHER PUBLICATIONS

U.S. Appl. No. 16/783,440, filed Feb. 6, 2020, Application and Drawings, 59 pages.

(Continued)

*Primary Examiner* — Jamie L McGowan
(74) *Attorney, Agent, or Firm* — Christopher R. Christenson; Kelly, Holt & Christenson, PLLC

(57) ABSTRACT

A volumetric metering system includes a housing configured to be coupled to a commodity container. The housing has a transducer portion. A roller is removably coupled within the housing and has an encoding tab with at least one circuit. The encoding tab is positioned to allow interaction between the circuit and the transducer portion when the roller is installed in the housing. A controller is operably coupled to the transducer portion and configured to cause the transducer portion to interact with the circuit and identify the roller based on the interaction. The controller is configured to automatically set roller information based on automatic identification of the roller. In one example, the roller is provided with a set of magnets the relative positions of which encode the roller.

17 Claims, 15 Drawing Sheets

(56) References Cited

U.S. PATENT DOCUMENTS

| | | | |
|---|---|---|---|
| 9,781,877 B2 | 10/2017 | Matrangolo | |
| 9,938,693 B1* | 4/2018 | Reed | G06Q 10/0833 |
| 11,205,337 B1 | 12/2021 | Derscheid et al. | |
| 11,252,853 B2 | 2/2022 | Blackwell et al. | |
| 11,579,590 B2 | 2/2023 | Harmon et al. | |
| 2009/0223096 A1* | 9/2009 | Wimmer | E02F 9/264 37/468 |
| 2014/0224888 A1* | 8/2014 | Bomer | G09B 5/06 235/494 |
| 2016/0088786 A1 | 3/2016 | Kornecki et al. | |
| 2016/0340866 A1 | 11/2016 | Koetz et al. | |
| 2017/0118905 A1* | 5/2017 | Bent | A01C 7/123 |
| 2017/0298992 A1 | 10/2017 | Koshi | |
| 2018/0338409 A1* | 11/2018 | Heathcote | A01C 21/005 |
| 2019/0090416 A1* | 3/2019 | Schembri | A01C 19/02 |
| 2019/0100309 A1 | 4/2019 | Flood et al. | |
| 2019/0112792 A1* | 4/2019 | Reed | E02F 3/437 |
| 2020/0070906 A1 | 3/2020 | Laperle et al. | |
| 2020/0113126 A1 | 4/2020 | Eising | |
| 2020/0146204 A1 | 5/2020 | Geng et al. | |
| 2020/0224386 A1* | 7/2020 | Shibata | E02F 9/2004 |
| 2020/0337213 A1 | 10/2020 | Schoeny | |
| 2021/0045276 A1 | 2/2021 | Henry | |
| 2021/0099251 A1 | 4/2021 | Podlozhnyuk et al. | |
| 2021/0123218 A1* | 4/2021 | Matzelle | E02F 3/96 |
| 2021/0127552 A1 | 5/2021 | Hubner et al. | |
| 2021/0157521 A1 | 5/2021 | Roy | |
| 2021/0173399 A1 | 6/2021 | Richard et al. | |
| 2021/0192867 A1 | 6/2021 | Fang et al. | |
| 2021/0197625 A1 | 7/2021 | Laperle et al. | |
| 2021/0339758 A1 | 11/2021 | Laperle et al. | |

FOREIGN PATENT DOCUMENTS

| | | |
|---|---|---|
| CA | 2885452 A1 | 9/2016 |
| CA | 2889850 A1 | 10/2016 |
| CN | 205912447 U | 2/2017 |
| CN | 208191248 U | 12/2018 |
| EP | 1774844 A2 | 4/2007 |
| EP | 2055168 A1 | 5/2009 |
| EP | 2404492 A2 | 1/2012 |
| EP | 3011815 A1 | 4/2016 |
| EP | 3146828 A1 | 3/2017 |
| EP | 3257348 A1 | 12/2017 |
| FR | 2646321 A1 | 11/1990 |
| GB | 1541629 A | 3/1979 |
| WO | WO2009127066 A1 | 10/2009 |
| WO | WO 2018020310 A1 | 2/2018 |

OTHER PUBLICATIONS

Prosecution History for U.S. Appl. No. 17/062,802, including: Non-Final Office Action dated Mar. 27, 2023, and Restriction Requirement, 16 pages.

Application and Drawings for U.S. Appl. No. 18/152,384, filed Jan. 10, 2023, 59 pages.

Ts-drill Operating Manual, Oct. 2016, Kverneland Group, 129 pages, see p. 49.

Extended European Search Report and Written Opinion issued in European Patent Application No. 20204518.3, dated Sep. 9, 2021, 15 pages.

Extended European Search Report and Written Opinion issued In European Patent Application No. 20204524.1, dated Apr. 1, 2021, 8 pages.

Non-Final Office Action for U.S. Appl. No. 16/783,440, dated Apr. 26, 2022, 23 pages.

Extended European Search Report and Written Opinion issued in European Patent Application No. 20204522.5, dated Mar. 17, 2021, in 9 pages.

Extended European Search Report and Written Opinion issued in European Patent Application No. 20204520.9, dated Mar. 26, 2021, in 5 pages.

Extended European Search Report and Written Opinion issued in European Patent Application No. 20204723.9, dated Apr. 1, 2021, in 8 pages.

Search Report for European Patent Application No. 22160712.0 dated Aug. 2, 2022, 9 pages.

Application and Drawings for U.S. Appl. No. 17/194,736, filed Mar. 8, 2021, 62 pages.

Application and Drawings for U.S. Appl. No. 17/062,802, filled Oct. 5, 2020, 32 pages.

Application and Drawings for U.S. Appl. No. 62/928,667, filed Oct. 31, 2019, 36 pages.

Notice of Allowance for U.S. Appl. No. 16/783,440 dated Oct. 11, 2022, 8 pages.

* cited by examiner

| Roller Electrical Contact Pattern | | | | Roller |
|---|---|---|---|---|
| Pin 1 | Pin 2 | Pin 3 | Pin 4 | |
| ○ | ● | ● | ○ | ultra low rate |
| ○ | ● | ○ | ● | low rate |
| ● | ○ | ● | ○ | medium rate |
| ● | ● | ○ | ○ | high rate |
| ● | ○ | ● | ○ | ultra high rate |

VOLUMETRIC METERING SYSTEM WITH IMPROVED ROLLER DETECTION

The present application is a continuation of and claims priority of U.S. patent application Ser. No. 62/928,667, filed Oct. 31, 2019, the content of which is hereby incorporated by reference in its entirety.

FIELD OF THE DESCRIPTION

This description generally relates to agricultural equipment. More specifically, but not by limitation, the present description relates to a system for automatically identifying a roller in a volumetric metering system of an agricultural machine.

BACKGROUND

Volumetric metering systems are used in the agricultural industry to apply a controlled amount of solid particles (e.g. seed or fertilizer) to an agricultural surface such as a crop or a field. As can be appreciated, when applying such materials, it is very important to apply the correct amount per acre. Over-seeding can result in wasted product, while under-seeding can result in lower yields per acre than the field could otherwise support. For fertilizer, over-application can result in damage to the plant, while under-application can reduce the efficacy of the application. Accordingly, for each application of bulk solids to an agricultural surface, proper metering is very important.

A given seeder or applicator of bulk solid materials will typically be used for a variety of different particle sizes. For example, grass seed is relatively small in comparison to a bean seed or corn seed. Modern volumetric metering systems are thus adjustable such that a given system can be used for widely varying particle sizes.

Typically, a seeder or applicator of bulk solid materials includes a hopper or other suitable container that has one or more volumetric metering systems located at a bottom portion thereof. The volumetric metering system includes a roller that has a number of recesses located between fins or flutes and a first portion of the roller engages the particles in the hopper. The particles fall into the recess and the roller turns such that the particles are transported out of the hopper and fall into a particle feed stream. This feed stream often includes airflow that helps convey the seeds or fertilizer along a path to be distributed to the agricultural surface.

In order to accommodate various different application rates and seeds, these rollers are designed to be easily changeable by an operator. Thus, the seeder can be changed from one type of application to another merely by changing out the rollers. Further, the rollers are also color-coded such that the flow rate or application can be easily discerned by the operator. However, the control system of the tractor or planter must also know the particular roller(s) used such that flow rate can be automatically controlled. For example, the tractor control system, using seeder roller information, is able to determine how much faster or slower to rotate the rotor based on the vehicle speed over ground.

Currently, the tractor control system is provided with roller information by having the operator manually enter the roller color installed on the seeder/applicator. For modern systems, this may be as many as 48 or more individual rollers on a given seeder or applicator. In the event that the operator enters the wrong color roller, the application rate for that roller will be erroneous. Additionally, while some attempts have been made to automatically confirm rollers using electrical techniques, such techniques appear to be limited to rollers that are rotating at an operational speed. Thus, there is a need to provide an improved volumetric metering system with automatic roller identification in order to reduce the need for an operator to manually enter roller information into the tractor control system in the first place.

The discussion above is merely provided for general background information and is not intended to be used as an aid in determining the scope of the claimed subject matter.

SUMMARY

A volumetric metering system includes a housing configured to be coupled to a commodity container. The housing has a transducer portion. A roller is removably coupled within the housing and has an encoding tab with at least one circuit. The encoding tab is positioned to allow interaction between the circuit and the transducer portion when the roller is installed in the housing. A controller is operably coupled to the transducer portion and configured to cause the transducer portion to interact with the circuit and identify the roller based on the interaction. The controller is configured to automatically set roller information based on automatic identification of the roller. In one example, the roller is provided with a set of magnets the relative positions of which encode the roller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
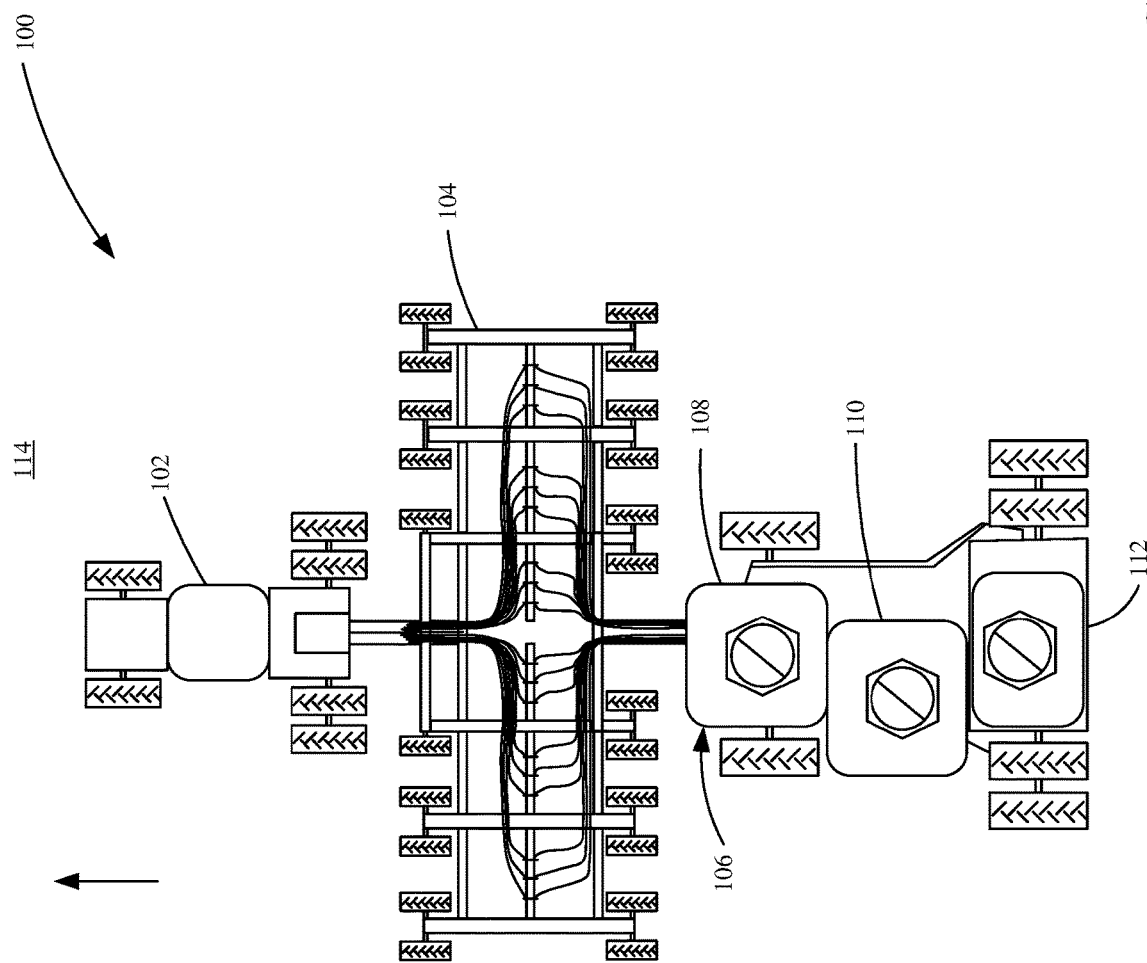
FIG. 1 is a top plan view of an agricultural environment in which embodiments of the present invention are particularly applicable.

FIG. 1 is a diagrammatic top plan view of an environment in which embodiments of the present invention are particularly applicable. As shown in FIG. 1, environment 100 includes a tractor 102 coupled to a seeder, such as an air seeder 104, which is coupled to a commodity cart 106. These couplings typically include mechanical, hydraulic, and electrical couplings. Accordingly, the operator of tractor 102 can make various adjustments to operation of seeder 104 and commodity cart 106. As tractor 100 pulls seeder 104 and commodity cart 106, solid particles within commodity hoppers 108, 110, or 112, are fed into respective volumetric metering systems and conveyed in one or more commodity lines to seeder 104 for application to the agricultural surface, such as field 114.

Figure 2:
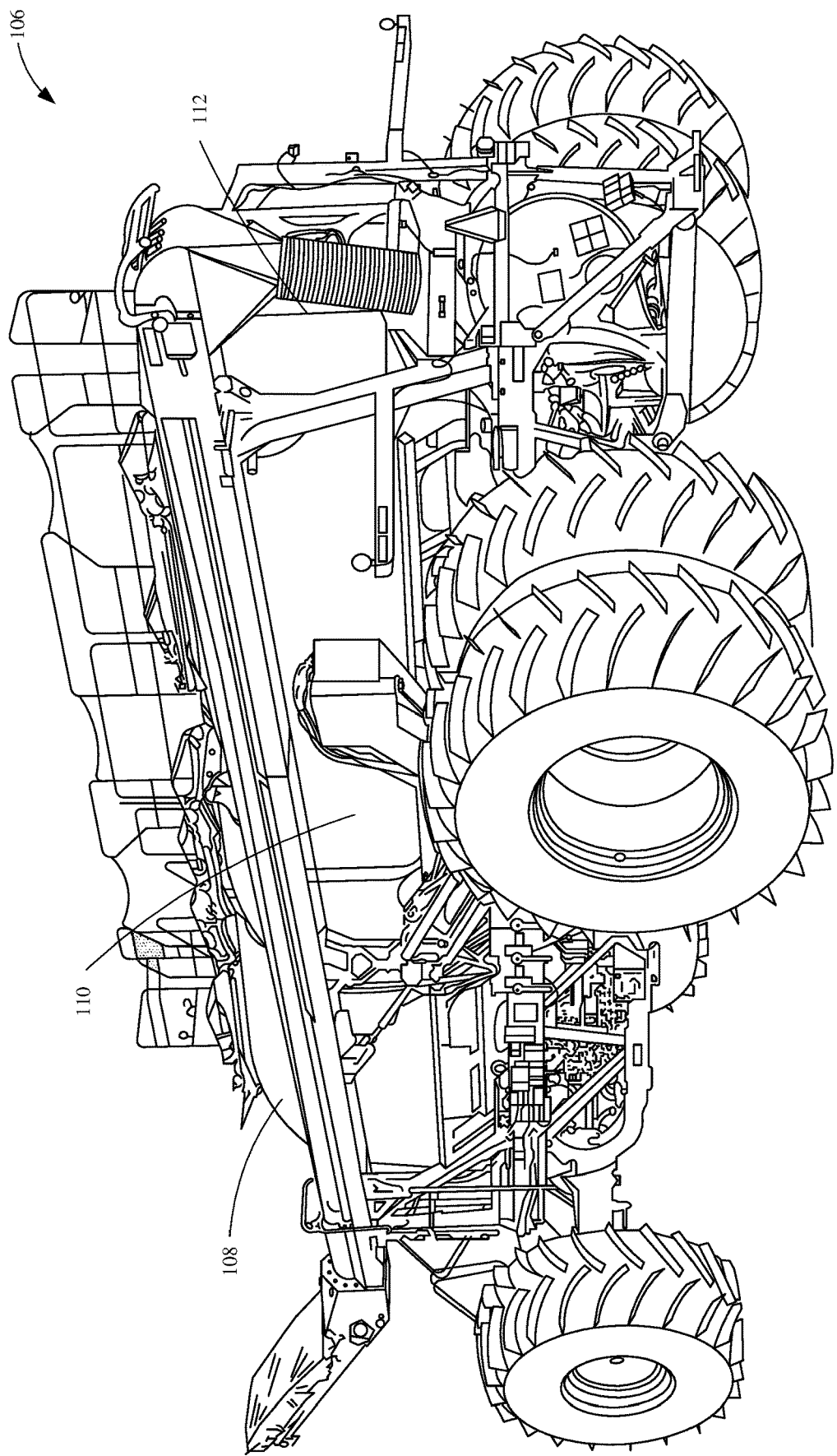
FIG. 2 is a perspective view of a commodity cart carrying a plurality of hoppers and associated volumetric metering systems with which embodiments of the present invention are particularly applicable.

FIG. 2 is a perspective view of one example of a system in which embodiments of the present invention are particularly applicable. As shown in FIG. 2, commodity cart 106 includes commodity hoppers 108, 110, and 112. Disposed at a bottom location of each respective hopper is a volumetric metering system that is configured, by virtue of selection of a volumetric roller, to provide a controlled feed of solid particles within the respective hoppers. While embodiments of the present invention will generally be described with respect to commodity cart 106, it is expressly contemplated that embodiments are applicable to any agricultural device that includes a roller-selectable feed rate for a volumetric metering system. For example, some seeders have a hopper disposed thereon and include their own volumetric metering system.

Figure 3:
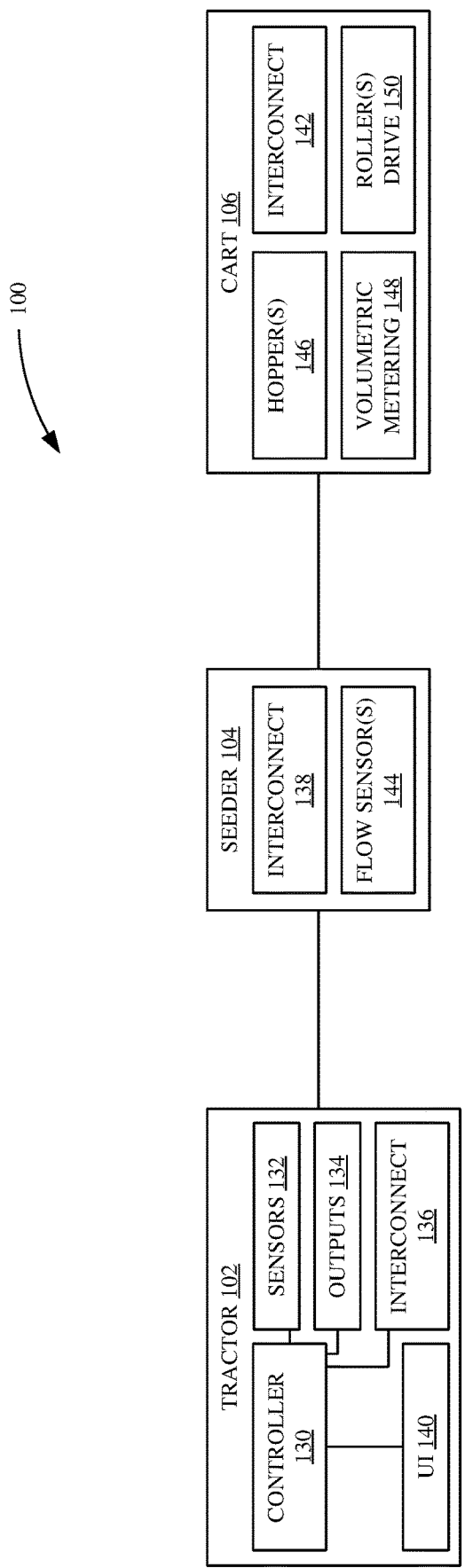
FIG. 3 is a block diagram of various electrical interconnections of the environment shown with respect to FIG. 1.

FIG. 3 is a diagrammatic view of electrical connections within environment 100. As shown, tractor 102 includes one or more controllers 130 that are coupled to a variety of tractor sensors 132 and tractor outputs 134. Additionally, tractor 102 includes an electrical interconnect 136 that is configured to couple to electrical interconnect 138 of seeder 104. Additionally, tractor 102 includes a user interface 140 coupled to controller(s) 130 in order to allow an operator located within the cab of tractor 102 to interact with the control system of the tractor 102, seeder 104, and commodity cart 106.

Electrical interconnect 138 of seeder 104 also facilitates the electrical connection between tractor 102 and commodity cart 106 via electrical interconnect 142 of commodity cart 106. Further, seeder 104 may include one or more suitable sensors 144 that sense the delivery of commodity, such as seeds or fertilizer, to the agricultural surface. These sensors 144 may be flow sensors or any suitable sensors that may provide an indication of the effective delivery of the commodity to the agricultural surface.

Commodity cart 106 includes commodity hoppers 108, 110, and 112, as illustrated diagrammatically at reference numeral 146, each hopper is coupled to a respective volumetric metering system 148 that employs a removable roller coupled to a roller drive 150, which is operably coupled to tractor output 134 in order to transport a controlled amount of commodity from the hopper to a commodity feed stream delivered to seeder 104.

Figure 4:
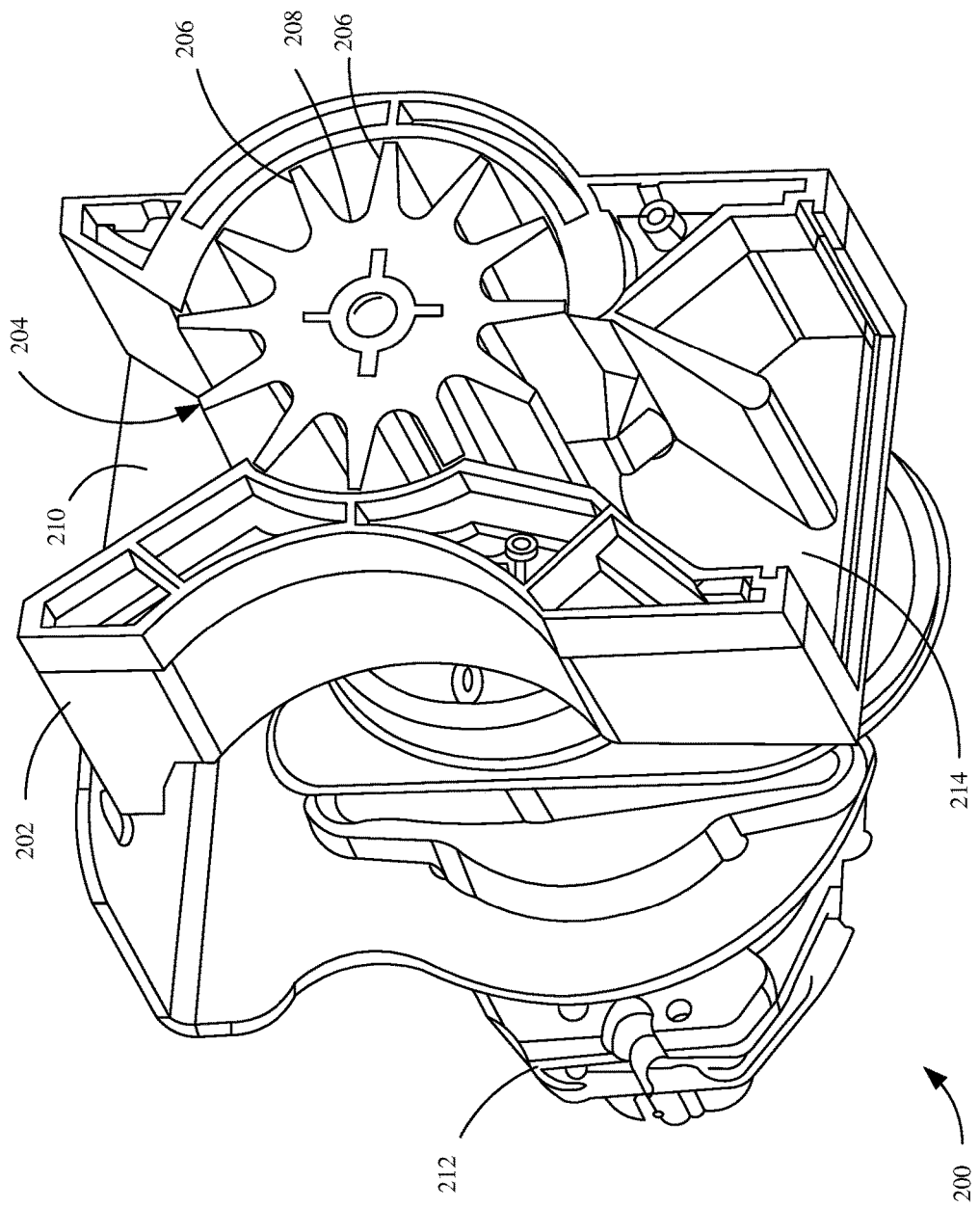
FIG. 4 is a perspective cutaway view of a volumetric metering system with which embodiments of the present invention are particularly applicable.

FIG. 4 is a diagrammatic perspective view of a volumetric metering system with which embodiments of the present invention are particularly applicable. Volumetric metering system 200 generally includes a housing 202, shown in cutaway form in FIG. 4. A roller 204 is disposed within housing 202 and includes a number of flutes 206 and recesses 208 disposed between flutes 206. A first region 210 of volumetric metering system 200 is configured to contact commodity within a hopper or storage container and as such, the commodity will fall into individual recesses 206. As roller 204 is rotated by roller drive 150, the commodity within the individual recesses 208 is transferred to region 214 where it can fall into a commodity stream. Often, the commodity stream includes an air-assisted flow stream that helps convey the commodity to a seeder, such as seeder 104. As can be appreciated, the size of the recesses 208, as well as the number of recesses disposed about roller 204 help determine the amount of commodity that can be delivered for a given rotation. Further, the width of the recesses 208 (along the axis of roller 204) also can be selected to help determine the flow rate. Accordingly, rollers 204 determine the delivery rate for the commodity. These rollers are generally color-coded in order to help operators select which rollers should be used for which purpose. For example, one roller may be red indicating that it is suitable for ultra-low rate applications or very small seed size, while a blue roller may indicate that it is suitable for ultra-high rate applications or application of relatively large seeds. Once the operator has installed the correct color rollers within the metering system(s) the operator will typically return to the cab of the tractor, such as tractor 102, and utilize user interface 140 to inform the control system of the selected rollers.

Figure 5:
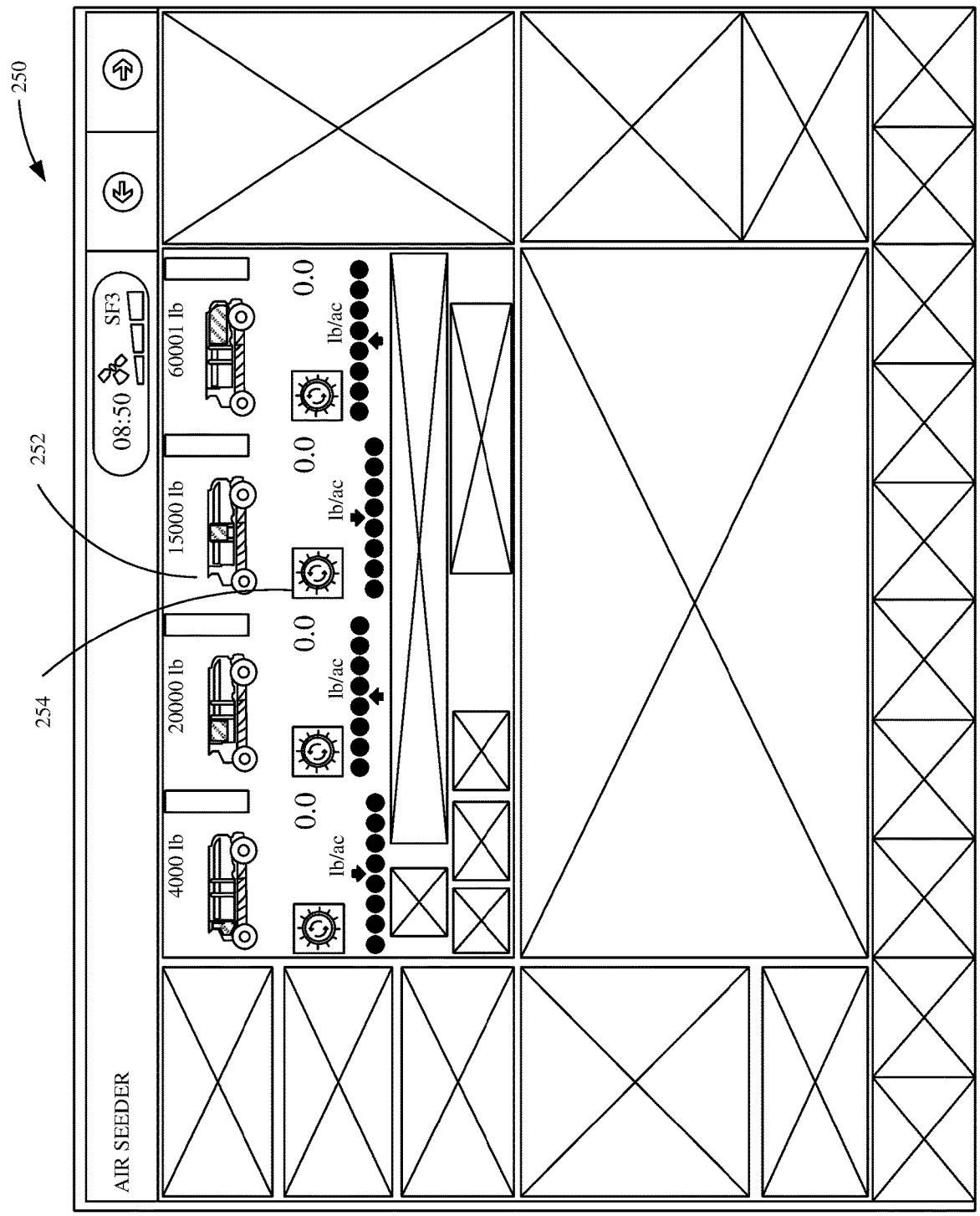
FIG. 5 is a screenshot of a user interface within the cab of a tractor, such as that shown in FIG. 1.

FIG. 5 is a diagrammatic screenshot of a user interface 140 where an operator will select the various installed roller colors. This is typically done by selecting a user interface element under the appropriate commodity cart being used. For example, if the operator is seeding with a commodity cart, the operator selects the roller color associated with each commodity tank, as illustrated at reference numeral 252a-d. It would be tedious to enter each roller individually, so in order to simplify the user interface, software will assume that each commodity tank has exclusively one color of roller installed. Accordingly, there is the potential for the operator to simply enter the wrong color for the commodity cart when the correct rollers are installed. Conversely, the correct roller color for the application could be entered via the user interface and one or more of the individual rollers at any or all of the tanks could be incorrect. If these errors occur, the automatic metering of that particular commodity will be erroneous. Further, as new commodity cart designs and technologies are used, it may be that the rollers are not easily visible to an operator once they are installed. Accordingly, verification of correct roller installation may not be as easy as viewing the installed rollers and then checking the settings on user interface 250.

Embodiments of the present invention generally provide automatic identification of a removable roller within a volumetric metering system. In some embodiments, this automatic identification can be done using legacy rollers. Legacy rollers, as defined herein, are rollers that have no additional encoding beyond their color. In other embodiments, however, the rollers may be encoded, in one form or another, in addition to their color coding.

In accordance with one embodiment, volumetric roller identification can be done for legacy rollers using existing sensors within the agricultural system.

Figure 6:
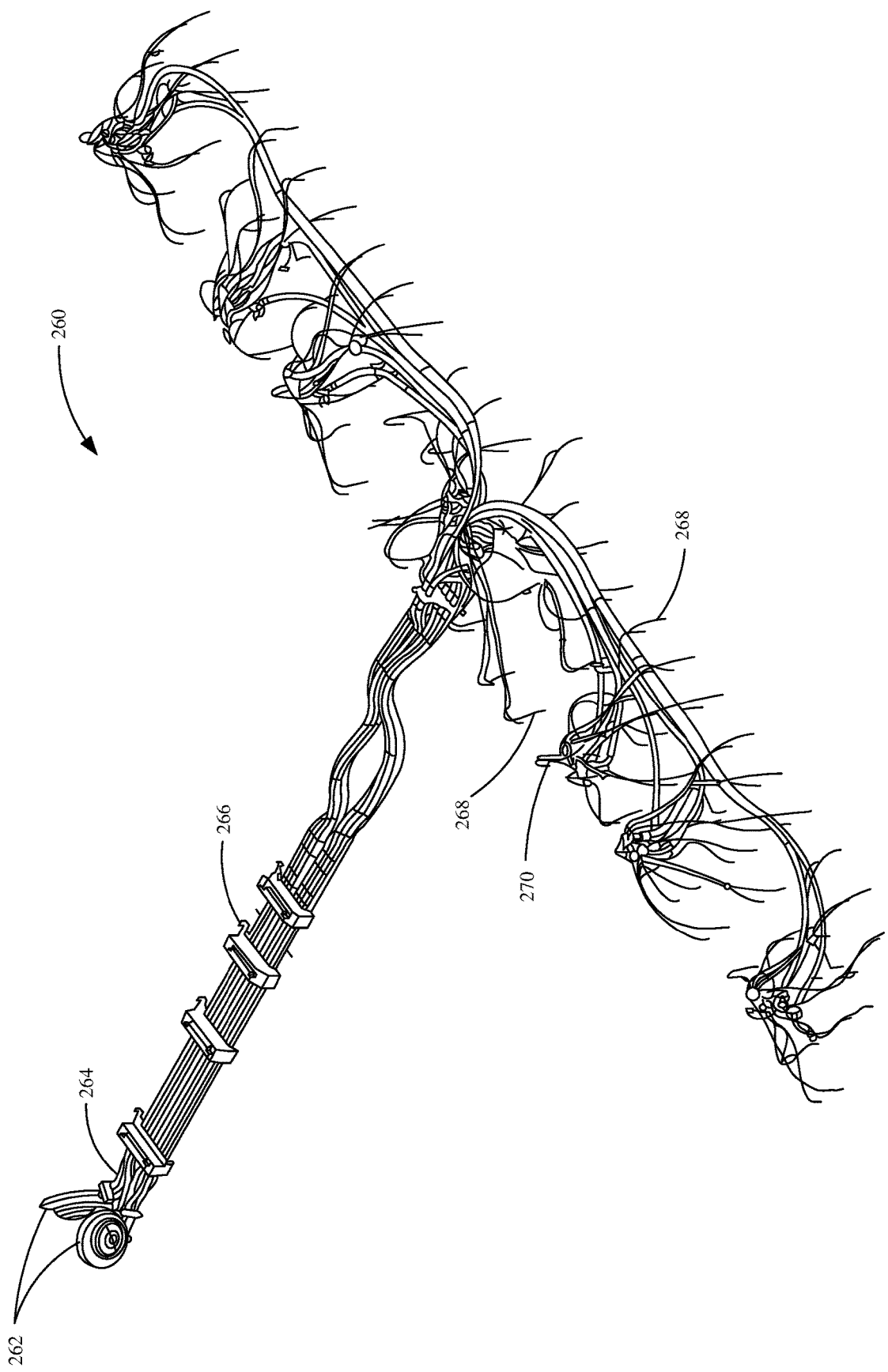
FIG. 6 is a diagrammatic view of a volumetric distribution system including a volumetric metering system and a plurality of sensors in accordance with an embodiment of the present invention.

FIG. 6 is a diagrammatic view of portions of a commodity cart and air seeder illustrating various connections which facilitate automatic roller detection in accordance with an embodiment of the present invention. Environment 260 illustrates a pair of air delivery units 262 coupled to various hoses 264 that provide air-assisted feed streams relative to one or more volumetric metering systems 266. As can be seen in FIG. 6, hoses 264 continue from the commodity cart to a seeder where they disperse the commodity to various applicator ends 268. Known seeders typically include a plurality of flow sensors 270 that are configured to provide an indication of seeds or commodity passing therethrough. Accordingly, when no such indication is provided, the blocking sensor can indicate that at least some of the applicators or the conduits feeding such applicators are blocked. In accordance with an embodiment of the present invention, the signal from a flow sensor of a seeder is monitored as a volumetric metering system, such as system 266, is selectively engaged.

Figure 7:
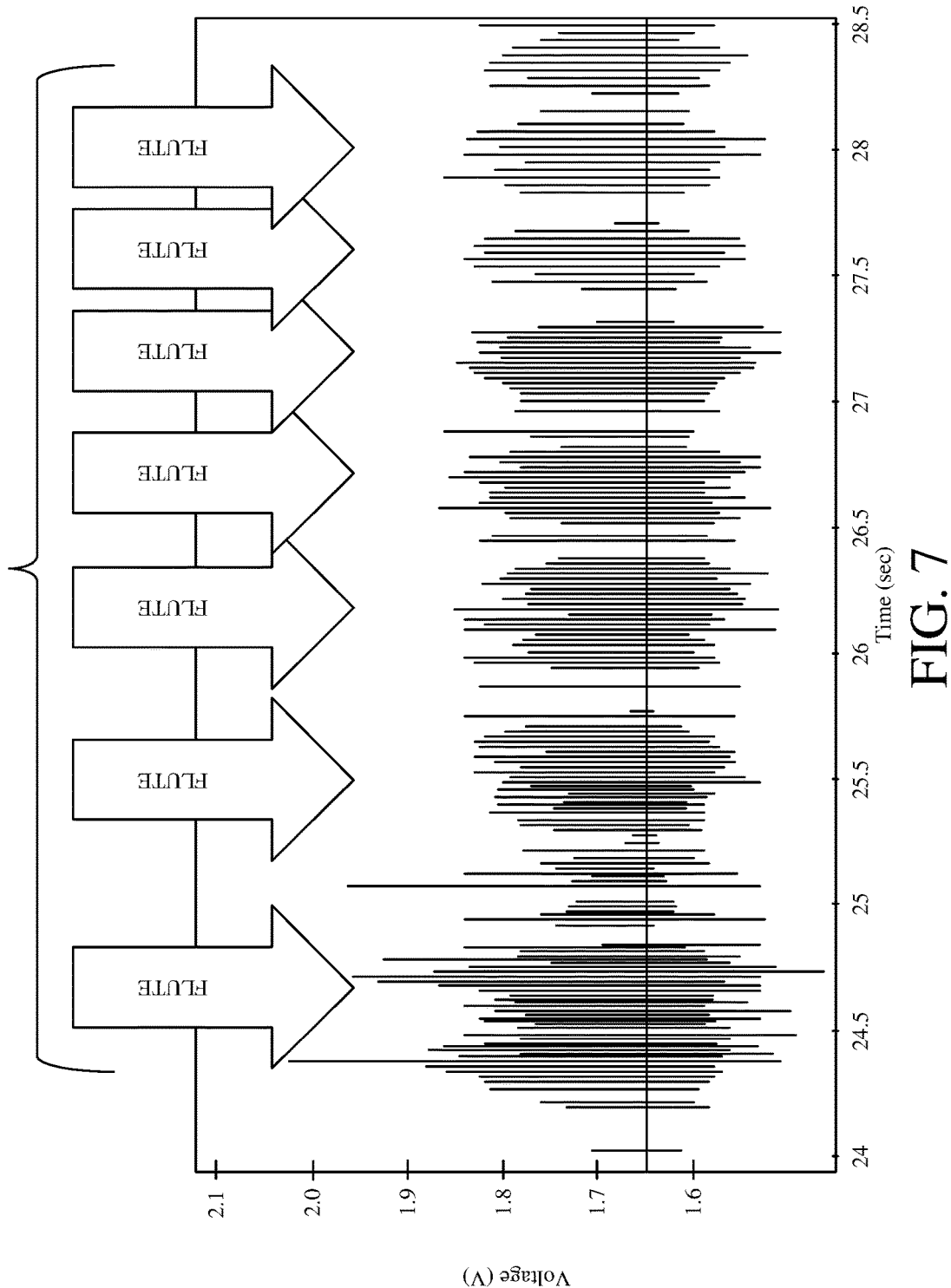
FIG. 7 is a chart of sensor response versus time illustrating detection of individual flutes or recesses of a roller in accordance with an embodiment of the present invention.

As shown in FIG. 7, when volumetric metering system 266 is engaged to rotate its roller one full rotation, the signal from flow sensor 270 can detect individual pulses 272 that correspond to individual flutes. Counting the number of detected pulses from a flow sensor per single rotation commanded by volumetric metering system 266, can provide an identification of the number of flutes on the selectable roller, and accordingly an identification of the roller itself. In this way, at least one embodiment of the present invention is able to detect or otherwise identify a selectable roller of a volumetric metering system using existing sensors, such as flow sensors on a seeder, to identify a legacy roller.

Figure 8:
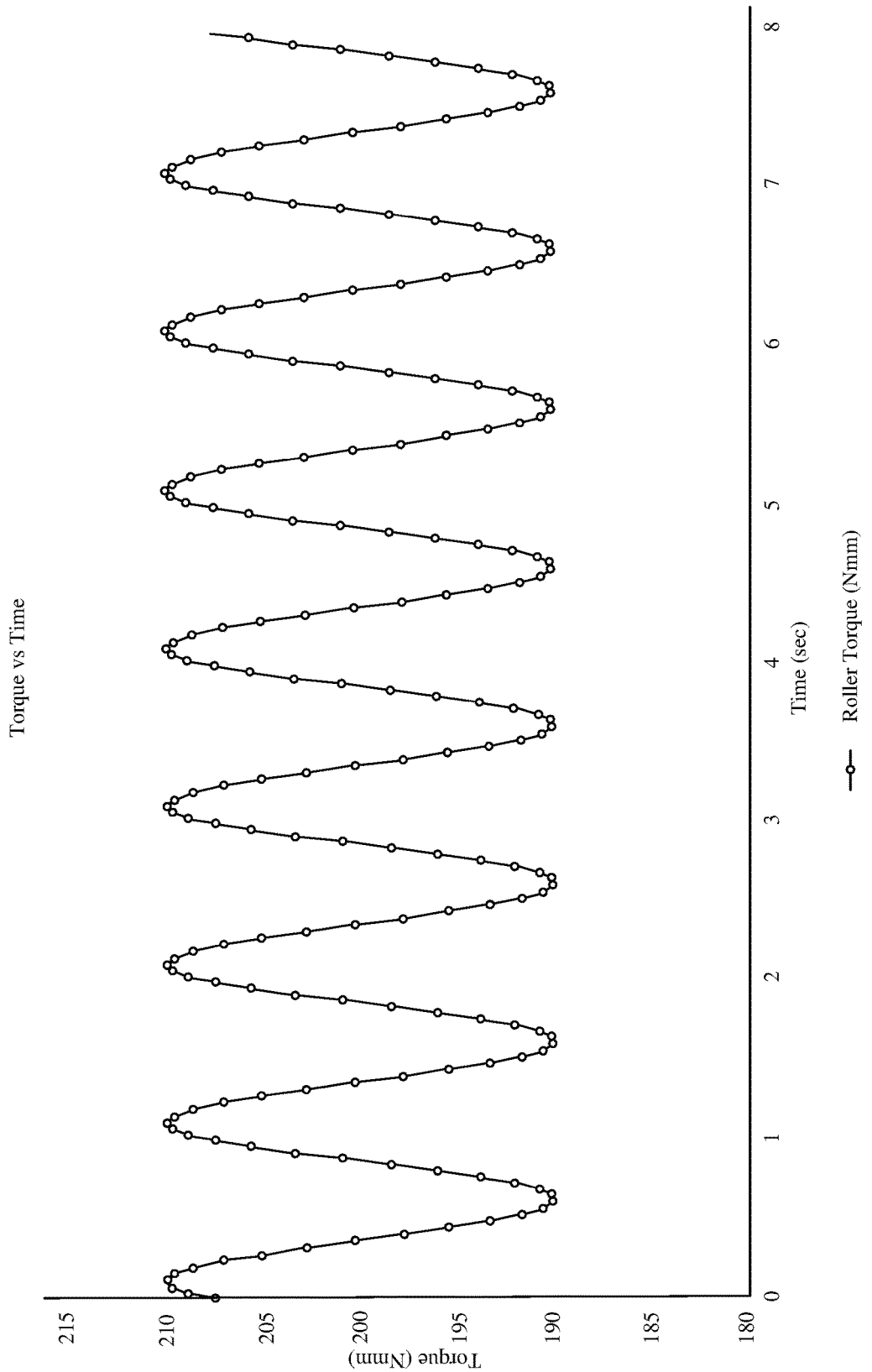
FIG. 8 is a chart of torque versus time illustrating variation in torque as being able to detect flutes or recesses in accordance with an embodiment of the present invention.

In accordance with another embodiment of the present invention, the torque exerted by the motor that drives the selectable roller can be monitored through its rotation. FIG. 8 is a diagrammatic chart of roller drive motor torque versus time showing variations occurring between 0 and 8 seconds (x-axis). As illustrated, the torque varies significantly from a high of approximately 210 Nmm to a low of approximately 190 Nmm as individual flutes engage the side wall of the housing, or pass into open regions 210, 214 (shown in FIG. 4). Counting the number of variations of motor torque for a given rotation of the drive motor, provides another independent indication of the number of flutes on the rotor, and accordingly identification of the roller itself.

Detecting the torque of the drive motor itself can be done in any suitable fashion. In one example, the current drawn by the motor is measured as the roller rotates. While embodiments described thus far are generally applicable to legacy rollers, it is also expressly contemplated that the rollers and/or housings may be adapted to facilitate encoding and automatic identification of the roller type. For example, in the embodiment that uses rolling torque detection one flute can be manufactured to be oversized or undersized in order to generate a different peak in order to index the roller.

While the embodiments described above with respect to FIGS. 5-8 provide two distinct techniques for automatically identifying legacy rollers using existing sensor and equipment, it is also expressly contemplated that these embodiments may be used in combination to provide a better indication or identification of the legacy rollers.

Figure 9A:
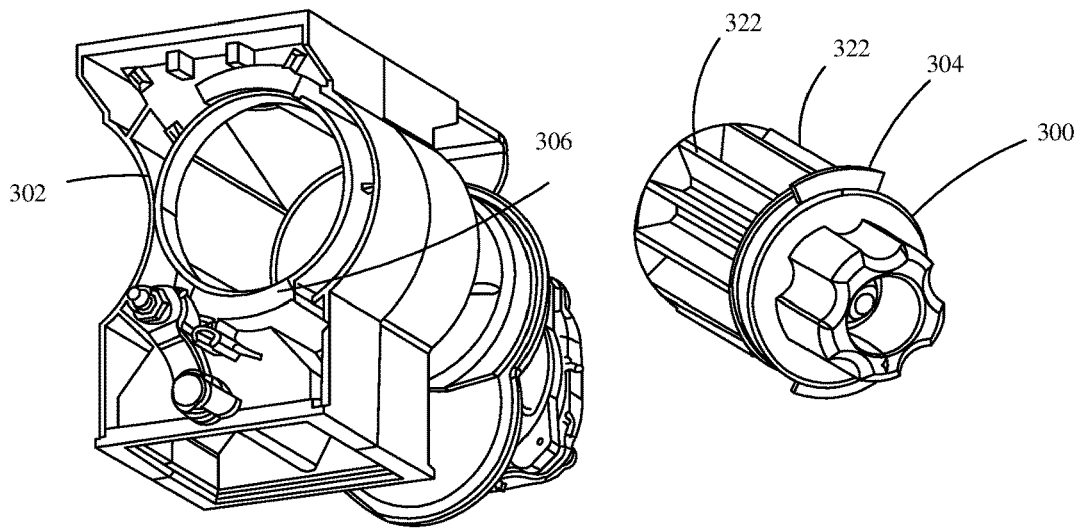
FIGS. 9A-9C are diagrammatic views of a volumetric metering system and encoded roller in accordance with one embodiment of the present invention.
Figure 9B:
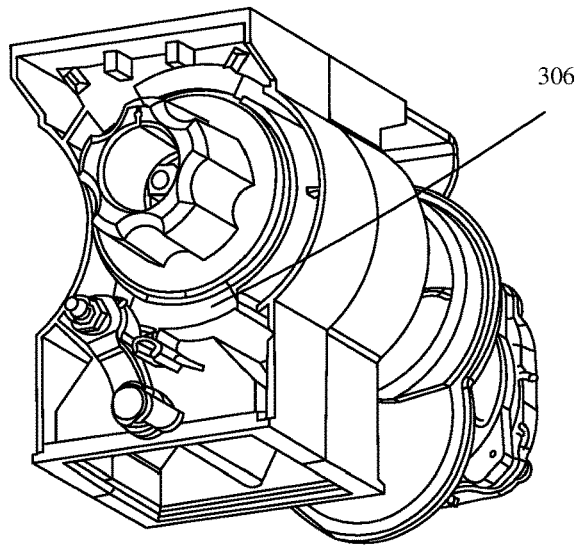
Figure 9C:
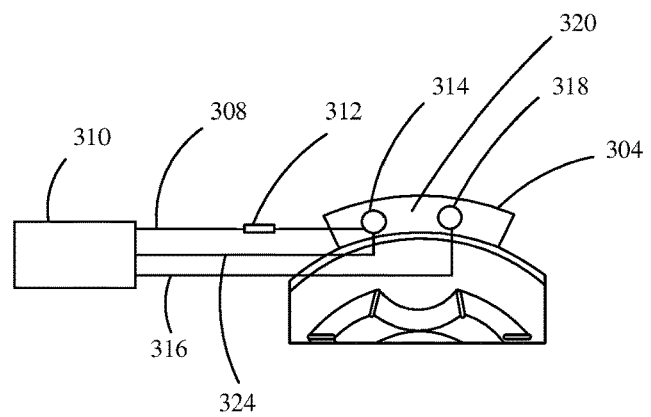

FIGS. 9A-9C are diagrammatic views illustrating a volumetric metering system housing and removable roller encoded in accordance with an embodiment of the present invention. FIG. 9A illustrates roller 300 removed from housing 302. As illustrated, roller 300 includes encoding tab 304 that is configured to engage electrical contacts provided within transducer region 306 of housing 302. When roller 300 is installed within housing 302, as shown in FIG. 9B, tab 304 is positioned proximate transducer region 306 and generates an electrical circuit when so coupled. This electrical circuit, illustrated diagrammatically in FIG. 9C, includes a supply line 308 provided by a controller 310 through a first resistor 312. The first resistor 312 makes electrical contact with a first contact pad 314 on a face of tab 304 while a ground line 316 makes electrical contact with contact pad 318. An electronic component 320 (such as electrical resistor) is electrically coupled between pads 314 and 318. The resistance value of resistor 320 is selected to be indicative of roller 300 thus electrically encoding roller 300. For example, roller 300 is shown having a certain number of flutes 322 (shown in FIG. 9A) and the value of component 320 may be indicative of the number of flutes 322 provided. For example, a 12-flute roller may have a resistance of resistor 314 that is arbitrarily selected to be 200 ohms. A different selectable roller having, for example, 5 flutes, may have a different value selected to be 500 ohms. In this way, when controller 310 applies supply voltage via line 308, the voltage present on sense line 324 will be indicative of resistor 320 and thus indicative of and identifying roller 300 uniquely. Controller 310 may then provide this identification of the roller or simply an indication of the sensed voltage to the tractor control system automatically such that the operator need not enter the roller identification in the first place. This simplifies interactions for the operator and also facilitates more accurate identification of the various rollers within the system. While this embodiment is described with electronic component 320 being a resistor, other types of electrical components (such as capacitors, transistors, MOSFETs, inductors, and combinations thereof) are expressly contemplated. As long as interaction with the circuit created by one or more electronic components 320 provides a detectable value that can be used to encode the roller, such as resonant frequency, it can be used.

Figure 10A:
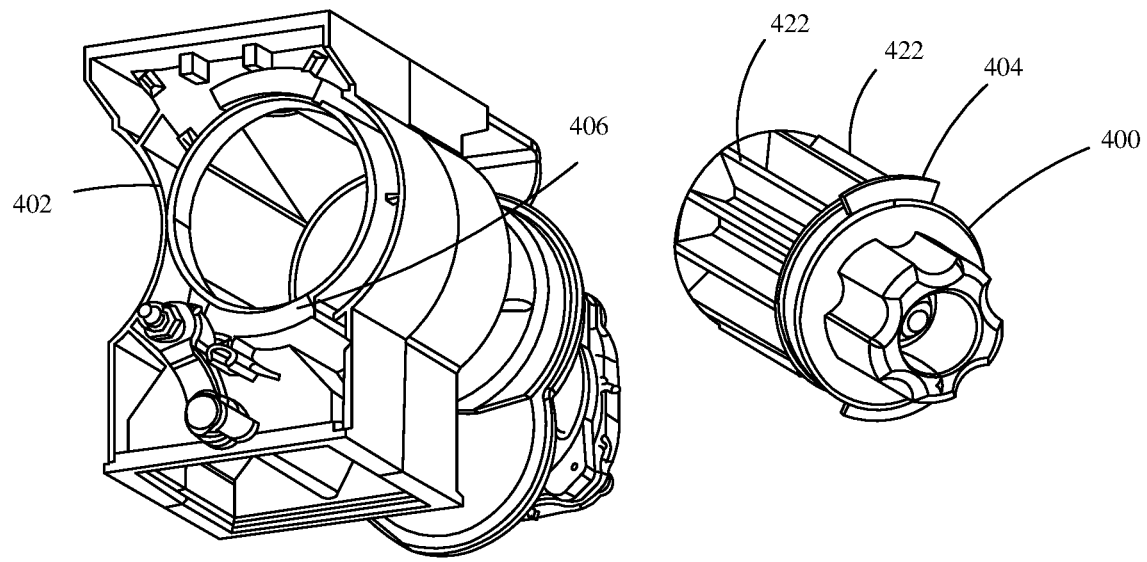
FIGS. 10A-10C are diagrammatic views of a volumetric metering system an encoded roller in accordance with another embodiment of the present invention.
Figure 10B:
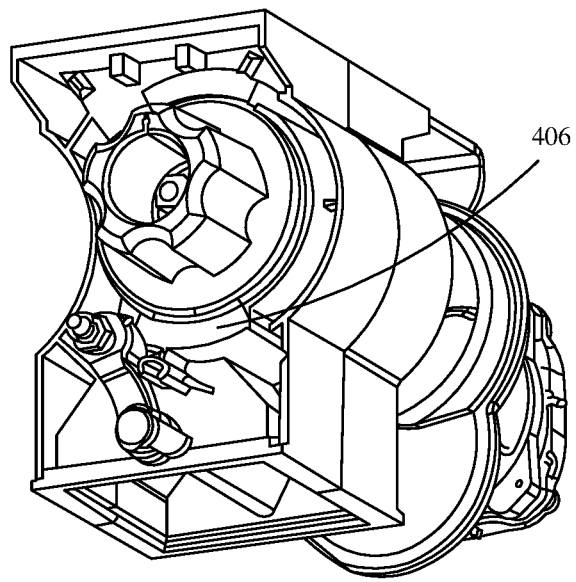
Figures 10C, 10D:
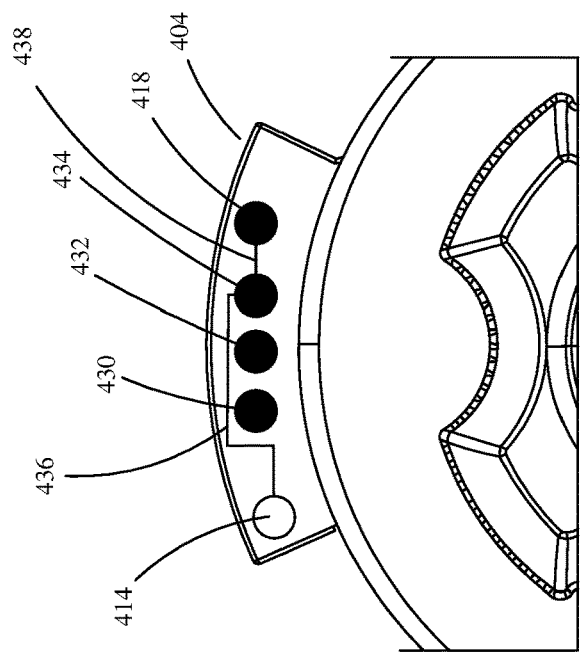
FIG. 10D is a table illustrating contact status versus pin for various rollers in accordance with an embodiment of the present invention.

FIGS. 10A-10C are diagrammatic views of a volumetric metering system an encoded roller in accordance with another embodiment of the present invention. FIGS. 10A-10C illustrate a roller encoded in accordance with an alternate electrical detection technique. FIGS. 10A and 10B are similar to FIGS. 9A and 9B, and like components are numbered similarly. The primary difference between the embodiment shown in FIGS. 9A-9C and that shown in FIGS. 10A-10C is the manner in which roller 400 is electrically encoded. As shown in FIG. 10C, tab portion 404 has five contact pads 414, 418, 430, 432, and 434. Contact pad 414 is electrically coupled, via trace 436, to a select number of the contact pads. For example, pad 414 is coupled to pads 434 and 418. The coupling between pads 434 and 418 is provided via trace 438. Accordingly, when roller 400 is installed within housing 402, transducer portion 406 will have five contact pins or pads that engage pads 414, 430, 432, 434, and 418 on tab 404. Some of the pads, such as pads 430, and 432, are not coupled to pad 414 while pads 434 and 418 are so coupled. Providing a voltage to pad 414, will generate a similar voltage on pads 434, and 418, but no such voltage on pads 430, and 432. In this way, arbitrary combinations of pads can be selected to be coupled to pad 414 in a way that unique identifies the roller. For example, FIG.

10D provides an exemplary table that shows the various contact pattern for pins 1-4 corresponding to different rate rollers. In general, an arbitrary number (n) of contact points will enable encoding of up to $2^{(n-1)}$ roller types.

Figure 11:
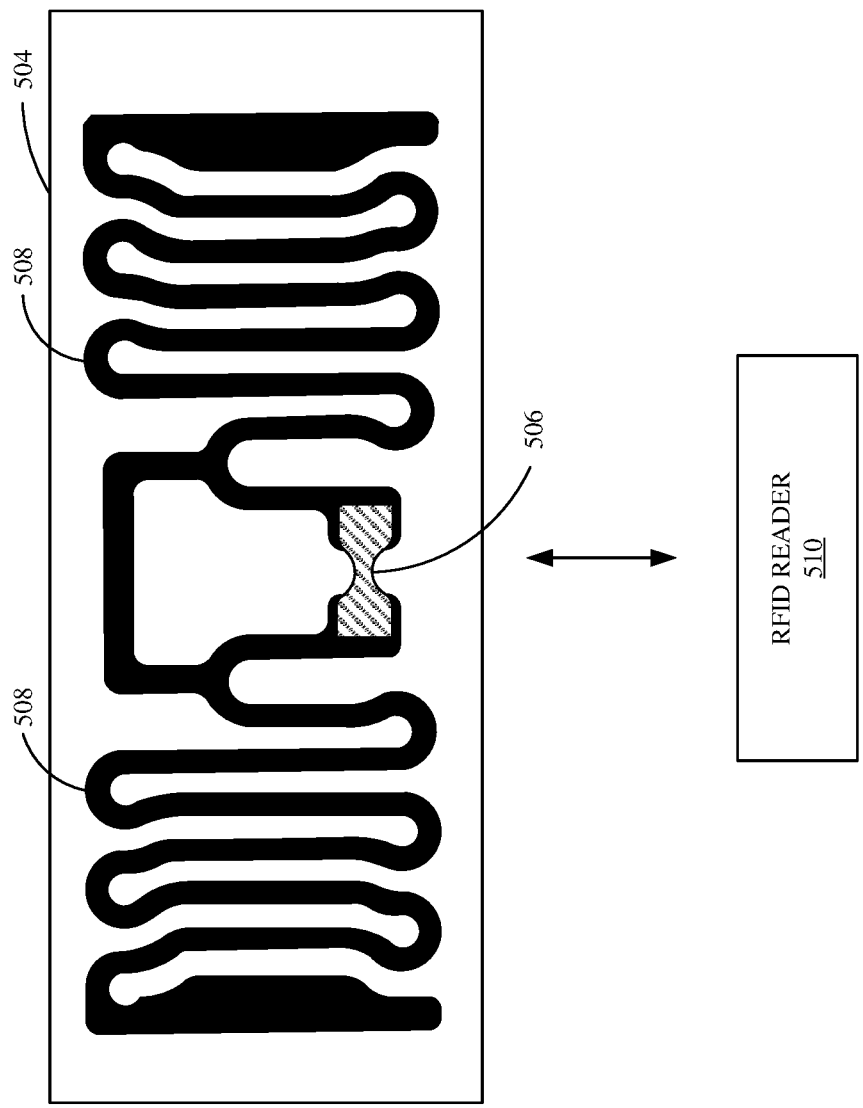
FIG. 11 is a diagrammatic view of an RFID system incorporated into a roller in accordance with another embodiment of the present invention.

FIG. 11 is a diagrammatic view of a wireless communication system (such as an NFC system or an RFID system) incorporated into a roller in accordance with another embodiment of the present invention. In the illustrated embodiment, each roller type may be configured to have its own wireless communication tag provided on or in a suitable roller tab. As shown in FIG. 11, tab 504 includes a wireless communication chip 506 coupled to a plurality of traces 508. In this way, wireless communication chip 506 and traces 508 are able to interact with a suitable wireless communication reader (such as an RFID reader), illustrated at reference numeral 510, positioned within a suitable transducer portion of the housing to detect and identify the roller by virtue of interacting with wireless communication chip 506 in accordance with known wireless communication techniques.

In embodiments that employ wireless communication chips 506, additional information may be encoded or otherwise provided by the roller. For example, such additional information may include the date of manufacture for the roller. The additional information may also include a unique identification number for the individual roller. The additional information can also include physical property information such as roller capacity, number of recesses, roller color, et cetera. The additional information can also include roller behavioral information such as calibration factor, roller life, et cetera. In this way, the control system may be provided with the ability to track usage of that particular roller over time in order to potentially detect or forecast wear or deterioration. Further, the detection of individual rollers via wireless communication technology can provide information indicative of revolution counts as well as duty cycle collection for such individual rollers.

While FIG. 11 shows wireless communication reader 510 as potentially positioned within a transducer portion of a housing, it is also expressly contemplated that active wireless communication technology can be used. In such case, each roller is still provided with a wireless communication chip and traces, such as shown in FIG. 11, but using active wireless communication allows a single reader to interact at greater ranges and thus interact with more than one roller wireless communication chip.

Figure 12:
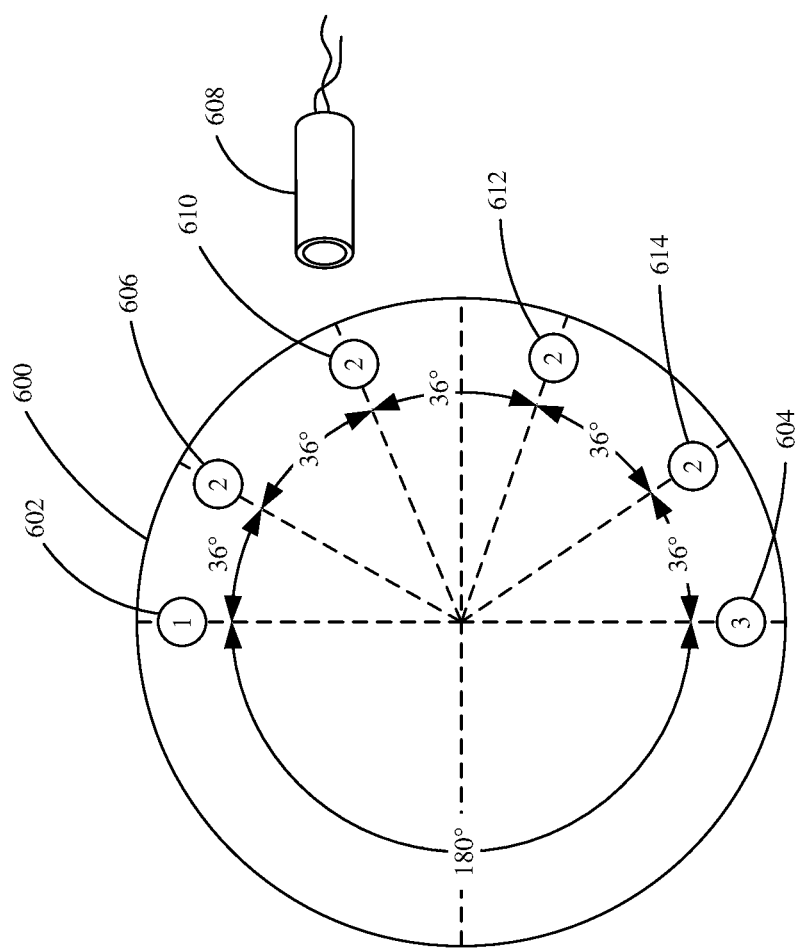
FIG. 12 is a diagrammatic view of a roller being encoded with magnets in accordance with another embodiment of the present invention.

FIG. 12 is a diagrammatic view of a roller identification encoding system in accordance with another embodiment of the present invention. As shown in FIG. 12, a roller 600 is shown on axis in elevation view. Roller 600 is provided with or manufactured to include a plurality of permanent magnets 602, 604. In the illustrated embodiment, these permanent magnets 602, 604 are positioned 180° apart from one another. Next, in accordance with an embodiment of the present invention, a third permanent magnet 606 is positioned at an angular interval between magnet 602, 604 where the angle is indicative of the roller itself. For example, at a first angular interval of 36° from magnet 602, permanent magnet 606 would indicate a black-colored roller. FIG. 12 illustrates a suitable sensor 608 disposed proximate roller 600 such that the magnetic fields of permanent magnets 602, 604, and 606 are detected upon rotation of roller 600 as each magnet is brought into physical proximity of sensor 608. Sensor 608 may be any suitable sensor including, but not limited to, a Hall effect sensor or a reed switch sensor 608. Sensor 608 is coupled to suitable measurement circuitry and/or controller 130 (shown in FIG. 3). Thus, as roller 600 is automatically identified the identification information is automatically entered into the tractor control system.

Upon rotation of wheel 600 at any constant rate, sensor 608 provides a signal that is regular with respect to detection of permanent magnets 602, 604. The detection of magnet 606 can be thus be identified between the regular intervals of detection of magnets 602, 604. This detection of the interval for permanent magnet 606 provides an indication and identification of roller 600. It is useful to note that this particular identification technique and system does not require a certain speed of rotation to be achieved for wheel 600; merely that sufficient rotation is provided such that the controller can detect the regular signal from sensor 608 indicative of permanent magnets 602, 604 passing by sensor 608. Further, detection of the magnets passing by sensor 608 is also a direct indication of rotation of the wheel. This wheel rotation indication is useful as an independent verification that the roller is rotating. This is useful for diagnostic purposes, and especially so in designs where the rollers may not be visible from the exterior of the volumetric metering system during the operation.

As shown in FIG. 12, in the event that a different type of roller, such as a yellow roller is used, magnet 606 would be omitted, and instead would be placed at the location shown at reference numeral 610. This would, upon detection, indicate the use of a yellow roller and the controller coupled to sensor 608 would automatically enter such information into the control system. Similarly, positioning a magnet at the location indicated at reference numeral 612 would be indicative of a green roller and the provision of a magnet at the location illustrated at reference numeral 614 would be indicative of a blue roller. As can be appreciated, any suitable number of different rollers can be encoded at different angular positions as long as the position of the particular encoding permanent magnet is discernable relative to the periodic signal created by permanent magnet 602 and 604. For example, in embodiments where 6 different rollers are encoded, the angular interval may be 180°/6 or 30°. Thus, as shown in FIG. 12, permanent magnets 602 and 604 are in the same position for all encoded rollers. The intermediate magnet changes position that is unique to each roller type as shown.

Figure 13:
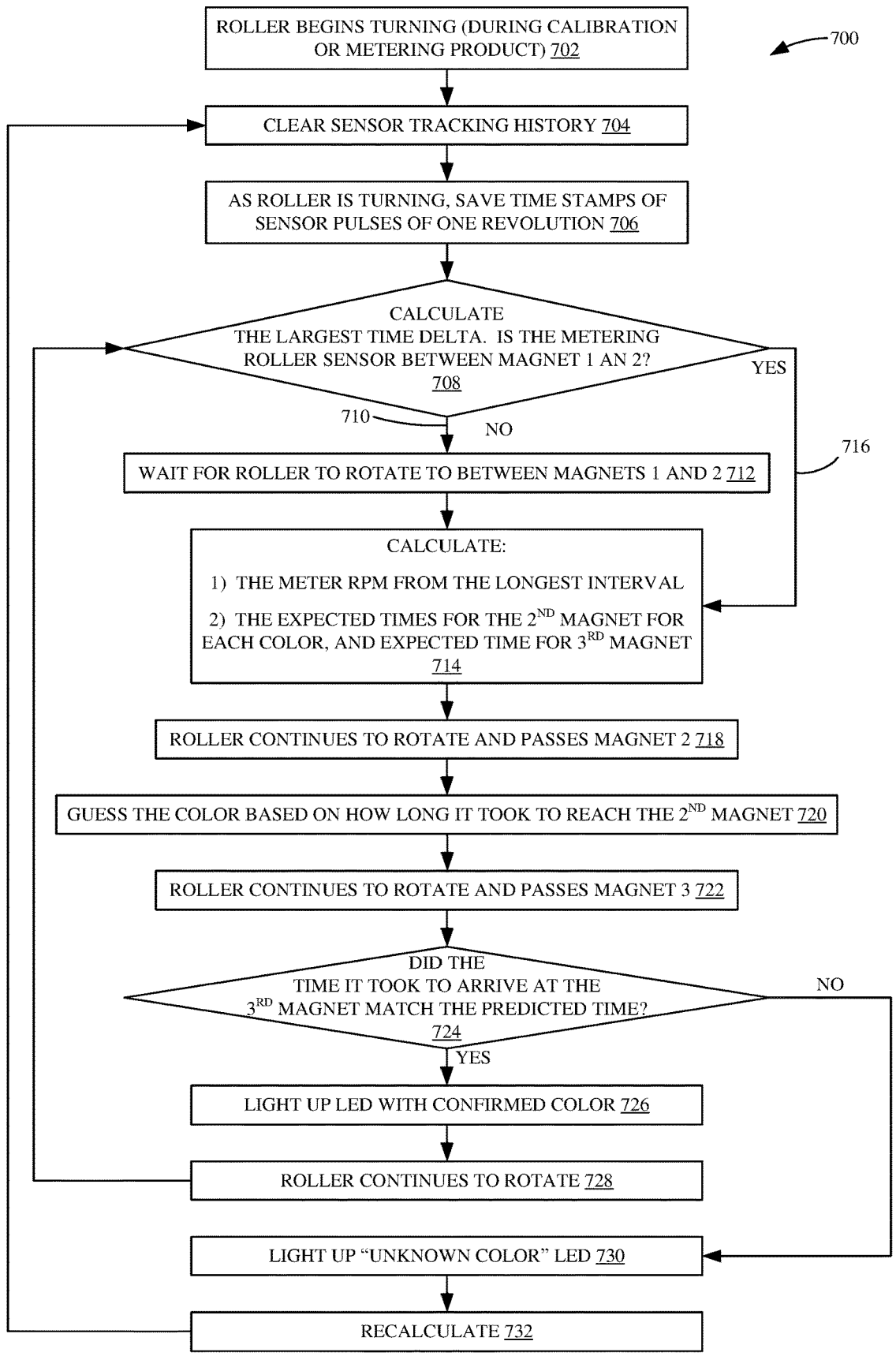
FIG. 13 is a flow chart of automatic roller identification in accordance with an embodiment of the present invention.

FIG. 13 is a flow diagram of a method of identifying an encoded roller in accordance with an embodiment of the present invention. Method 700 begins at block 702 where the controller commands the roller to begin turning, such as during calibration or metering product. Next, at block 704, any accumulated sensor tracking history is preferably cleared. Then, as the roller is turning, timestamps are saved of sensor pulses for one roller revolution, as indicated at reference numeral 706. Next, at block 708, the largest time difference or delta between the pulses is calculated. Further at block 708, the system determines whether the metering roller sensor is between the first permanent magnet (602—shown in FIG. 12) and the roller encoding magnet, such as magnet 606 shown in FIG. 12. If the result is in the negative, as illustrated at reference numeral 710, control passes to block 712 where the controller waits for the roller to rotate between magnets 1 (602) and 2 (606). Once this occurs, control passes to block 714 where the controller calculates the roller rotational speed (RPM) based on the calculated largest time delta from block 708. Next, during block 714, the expected times for the encoding magnet for each color and the expected time for the third magnet (604) are calculated based on the calculated rotational speed.

If, during block 708, the roller sensor is determined to be between the first permanent magnet and the encoding magnet, control passes directly to block 714, as indicated at reference numeral 716. Upon completion of block 714, control passes to operation 718 where the roller continues to rotate and passes the roller encoding magnet. Next, at block 720, the controller estimates the encoded roller based on how long it took to detect the roller encoding magnet with the sensor 608. As indicated at reference numeral 722, the roller continues to rotate until the third magnet (604—shown in FIG. 12) is detected by sensor 608. Upon detection of the third magnet, block 724 executes to determine if the time it took for the third magnet to be detected matches the predicted time based on the calculated rotational speed. If so, control passes to block 726 where the roller is correctly identified and roller identification is provided to the control system.

As indicated at reference numeral 728, upon correct roller identification, the method preferably loops by returning to block 708. On the other hand, if, at block 724, the controller indicates that the third magnet arrival time did not match the predicted time, then control passes to block 730 where an error is provided, such as an indication that an unknown color or non-identifiable roller has been detected. Then, control returns to block 704 via line 732 and the method repeats once the sensor tracking history is cleared.

Figure 14:
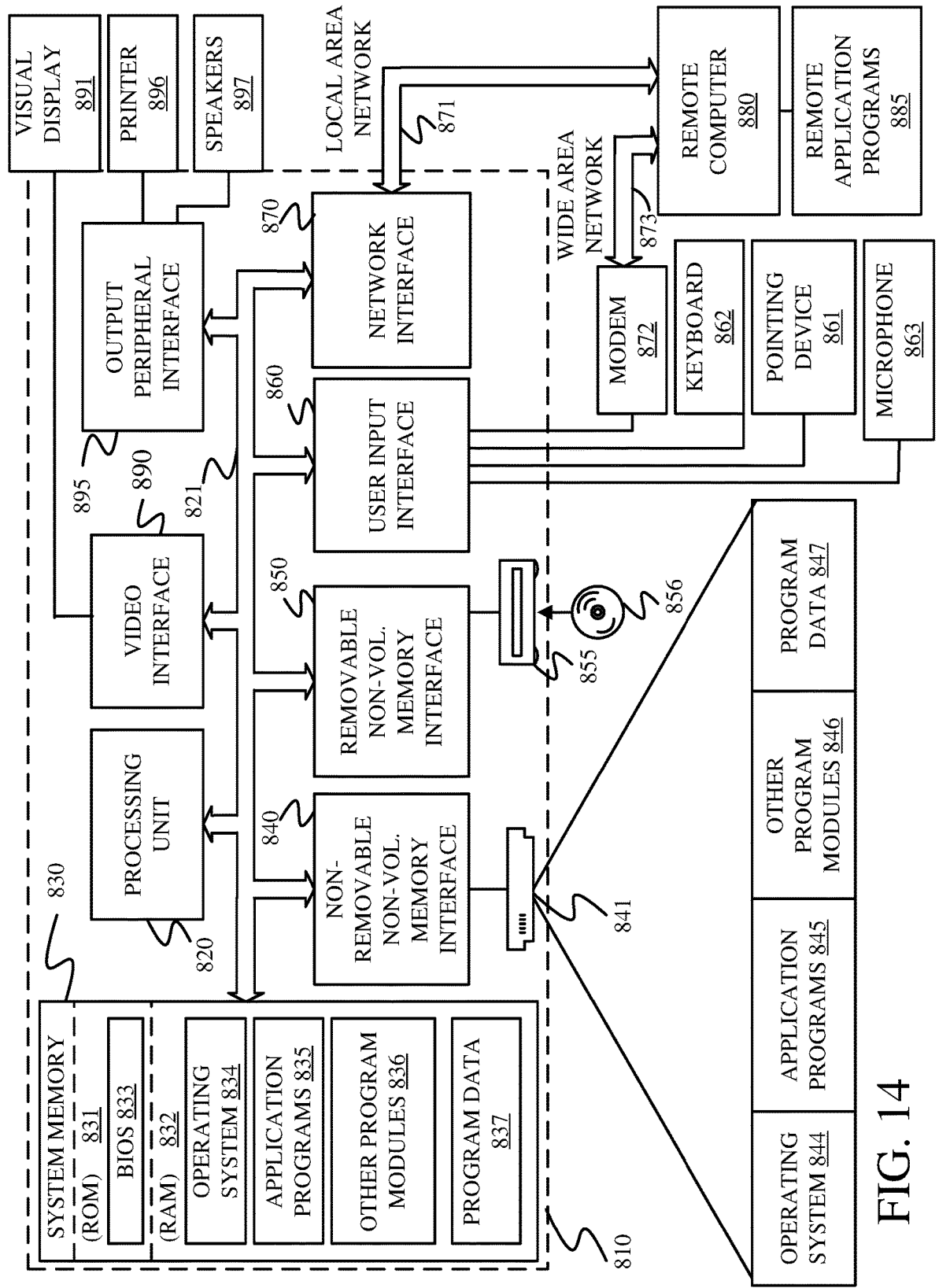
FIG. 14 is a computing environment used in accordance with the present invention.

FIG. 14 is one example of a computing environment in which elements of FIG. 3, or parts of it, (for example) can be deployed. With reference to FIG. 14, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a volumetric metering system that includes a housing configured to be coupled to a commodity container. The housing has a transducer portion. A roller is removably coupled within the housing. The roller has an encoding tab with at least one circuit. The encoding tab is positioned to allow interaction between the circuit and the transducer portion when the roller is installed in the housing. A controller is operably coupled to the transducer portion and is configured to cause the transducer portion to interact with the circuit and identify the roller based on the interaction. The controller is configured to automatically set roller information based on automatic identification of the roller.

Example 2 is a volumetric metering system of any or all previous examples wherein the encoding tab has a plurality of contact points and an electronic component electrically coupled between the plurality of contact points, the electronic component having a value that encodes roller type.

Example 3 is a volumetric metering system of any or all previous examples wherein the electronic component is an electronic component selected from the group consisting of a resistor, a transistor, and a MOSFET.

Example 4 is a volumetric metering system of any or all previous examples wherein the resistor has a resistance value that encodes the roller.

Example 5 is a volumetric metering system of any or all previous examples wherein the encoding tab has a plurality of contact points and at least one circuit trace disposed between the plurality of contact points.

Example 6 is a volumetric metering system of any or all previous examples wherein the at least one circuit trace generates a continuity that encodes the roller type.

Example 7 is a volumetric metering system of any or all previous examples wherein the plurality of contact points includes n contact points and continuity patterns encode for up to $2^{(n-1)}$ roller types.

Example 8 is a volumetric metering system of any or all previous examples wherein the encoding tab includes an RFID chip containing information that encodes roller type.

Example 9 is a volumetric metering system of any or all previous examples wherein the transducer portion includes an RFID reader.

Example 10 is a volumetric metering system of any or all previous examples wherein the RFID chip contains additional information.

Example 11 is a volumetric metering system of any or all previous examples wherein the additional information includes information selected from the group consisting of roller capacity, number of recesses, roller color, calibration factor, roller life, and an identification number of the roller.

Example 12 is a volumetric metering system that includes a housing configured to be coupled to a commodity container. A roller is removably coupled within the housing. The roller has a first magnet disposed at a first position on the roller, a second magnet disposed at a fixed angular distance from the first magnet, and a third magnet disposed on the roller between the first and second magnets, the position of the third magnet encoding the roller. A sensor is disposed to detect the first, second and third magnets.

Example 13 is a volumetric metering system of any or all previous examples wherein the fixed angular distance is 180 degrees.

Example 14 is a volumetric metering system of any or all previous examples wherein the first, second and third magnets are disposed on the roller.

Example 15 is a volumetric metering system of any or all previous examples wherein the sensor is coupled to a controller that is configured to determine the position of the third magnet encoding the roller and automatically determine roller information based on the position of the third magnet.

Example 16 is a method of determining roller information in a volumetric metering system. The method includes causing a roller of the volumetric metering system to rotate. Monitoring a sensor value while the roller is rotating, the sensor value having fluctuations indicative of physical components of the roller. A number of sensor fluctuations are counted per rotation of the roller. A roller type is determined based on the number of sensor fluctuations per rotation.

Example 17 is a method of determining roller information in a volumetric metering system of any or all previous examples wherein the sensor value is a value of a flow sensor.

Example 18 is a method of determining roller information in a volumetric metering system of any or all previous examples wherein the sensor value is provided by a sensor configured to sense torque of a motor that drives the roller.

Example 19 is a method of determining roller information in a volumetric metering system of any or all previous examples wherein roller is a legacy roller.

Example 20 is a method of determining roller information in a volumetric metering system of any or all previous examples wherein monitoring a sensor value includes monitoring a value of a flow sensor and monitoring a motor torque value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while a number of sensors have been described in various embodiments, it is expressly contemplated that other types of sensors could also be used in accordance with embodiments of the present invention. Such sensors include, without limitation, optical sensors, imaging sensors, color detection sensors, and/or thermal image sensors.

What is claimed is:

1. A volumetric metering system comprising:
   a housing configured to be coupled to a commodity container, the housing having a transducer portion;
   a roller removably coupled within the housing, the roller having an encoding tab with at least one circuit, wherein the encoding tab is positioned to allow interaction between the circuit and the transducer portion when the roller is installed in the housing;
   a controller operably coupled to the transducer portion and configured to cause the transducer portion to interact with the circuit and identify the roller based on the interaction, the controller being configured to automatically set roller information based on automatic identification of the roller; and wherein the housing has an aperture configured to receive the roller and wherein the encoding tab is positioned proximate an end of the roller and the encoding tab is a segment of a circle, and wherein the circle has a diameter greater than a diameter of the housing aperture.

2. The volumetric metering system of claim 1, wherein the encoding tab has a plurality of contact points and an electronic component electrically coupled between the plurality of contact points, the electronic component having a value that encodes roller type.

3. The volumetric metering system of claim 2, wherein the electronic component is an electronic component selected from the group consisting of a resistor, a transistor, and a MOSFET.

4. The volumetric metering system of claim 3, wherein the electronic component has a value that encodes the roller.

5. The volumetric metering system of claim 1, wherein the encoding tab has a plurality of contact points and at least one circuit trace disposed between the plurality of contact points.

6. The volumetric metering system of claim 5, wherein the at least one circuit trace generates a continuity that encodes the roller type.

7. The volumetric metering system of claim 6, wherein the plurality of contact points includes n contact points and continuity patterns encode for up to $2^{(n-1)}$ roller types.

8. The volumetric metering system of claim 1, wherein the encoding tab includes a wireless communication chip containing information that encodes roller type.

9. The volumetric metering system of claim 8, wherein the transducer portion includes a wireless communication reader.

10. The volumetric metering system of claim 8, wherein the wireless communication chip contains additional information.

11. The volumetric metering system of claim 10, wherein the additional information includes information selected from the group consisting of roller capacity, number of recesses, roller color, calibration factor, roller life, and an identification number of the roller.

12. The volumetric metering system of claim 1, wherein the roller has a plurality of flutes, and wherein the controller is configured to automatically set a number of flutes in a control system based on the interaction with the circuit.

13. The volumetric metering system of claim 1, wherein the encoding tab has a face that opposing a face of the transducer portion.

14. The volumetric metering system of claim 13, wherein the face of the encoding tab includes a plurality of contact points configured to contact corresponding points on the transducer portion.

15. The volumetric metering system of claim 14, wherein the circuit includes a resistor having a resistance that encodes the number of flutes of the roller.

16. The volumetric metering system of claim 14, wherein the circuit includes a continuity path that encodes the number of flutes of the roller.

17. The volumetric metering system of claim 12, wherein the roller includes a drive portion configured to receive rotational energy to rotate the roller, and wherein the encoding tab is disposed between the flutes and the drive portion.

* * * * *